United States Patent
Alvarado et al.

(10) Patent No.: US 7,739,173 B2
(45) Date of Patent: Jun. 15, 2010

(54) METHOD FOR MANAGING RISK IN MARKETS RELATED TO COMMODITIES DELIVERED OVER A NETWORK

(75) Inventors: Fernando L. Alvarado, Madison, WI (US); Rajesh Rajaraman, Madison, WI (US)

(73) Assignee: Morgan Stanley Dean Witter & Co., New York, NY (US)

( * ) Notice: Subject to any disclaimer, the term of this patent is extended or adjusted under 35 U.S.C. 154(b) by 0 days.

(21) Appl. No.: 11/236,600

(22) Filed: Sep. 28, 2005

(65) Prior Publication Data
US 2006/0026095 A1 Feb. 2, 2006

Related U.S. Application Data

(62) Division of application No. 09/522,709, filed on Mar. 10, 2000.

(60) Provisional application No. 60/123,823, filed on Mar. 11, 1999.

(51) Int. Cl.
G06Q 40/00 (2006.01)
(52) U.S. Cl. ....................... 705/36 R; 705/35
(58) Field of Classification Search ............... 705/37, 705/36, 26, 412, 38, 400, 10, 34, 35, 36 R; 235/379; 702/61
See application file for complete search history.

(56) References Cited

U.S. PATENT DOCUMENTS

| | | | |
|---|---|---|---|
| 3,913,829 A * | 10/1975 | Fink ........................... 705/412 |
| 4,405,987 A | 9/1983 | Spalti | |
| 4,677,552 A | 6/1987 | Sibley, Jr. | |
| 4,752,877 A * | 6/1988 | Roberts et al. ............. 705/36 R |
| 4,903,201 A * | 2/1990 | Wagner ....................... 705/37 |
| 4,980,826 A * | 12/1990 | Wagner ....................... 705/37 |
| 5,202,827 A * | 4/1993 | Sober ......................... 705/36 R |
| 5,432,710 A * | 7/1995 | Ishimaru et al. ............. 705/412 |
| 5,519,622 A * | 5/1996 | Chasek ........................ 705/412 |
| 5,758,331 A | 5/1998 | Johnson | |
| 5,784,696 A * | 7/1998 | Melnikoff ................... 705/36 R |
| 5,794,212 A * | 8/1998 | Mistr, Jr. ..................... 705/26 |
| 5,812,987 A * | 9/1998 | Luskin et al. ............. 705/36 R |

(Continued)

FOREIGN PATENT DOCUMENTS

WO WO 00/54198 9/2000

OTHER PUBLICATIONS

Jeffrey MacKie-Mason and Hal Varian, Pricing Congestible Network Resources, University of Michigan, Jul. 1994, pp. 1-22.*

(Continued)

Primary Examiner—Susanna M Diaz
Assistant Examiner—Jamie H Swartz
(74) Attorney, Agent, or Firm—McDermott Will & Emery LLP

(57) ABSTRACT

A system, method, software, and portfolios for managing risk in markets relating to a commodity delivered over a network are described, in which a market participant constructs portfolios of preferably liquid price risk instruments in proportions that eliminate the Spatial Price Risk for the market participant's underlying position. Techniques are also disclosed for constructing and evaluating new price risk instruments and other sets of positions, as well as identifying arbitrage opportunities in those markets.

2 Claims, 2 Drawing Sheets

U.S. PATENT DOCUMENTS

| | | | |
|---|---|---|---|
| 5,812,988 A * | 9/1998 | Sandretto | 705/36 R |
| 5,819,237 A | 10/1998 | Garman | |
| 5,854,903 A | 12/1998 | Morrison et al. | |
| 5,905,666 A | 5/1999 | Hoffman et al. | |
| 5,930,773 A * | 7/1999 | Crooks et al. | 705/30 |
| 5,930,774 A * | 7/1999 | Chennault | 705/36 R |
| 5,930,779 A * | 7/1999 | Knoblock et al. | 705/412 |
| 5,963,923 A * | 10/1999 | Garber | 705/37 |
| 5,970,479 A * | 10/1999 | Shepherd | 705/37 |
| 5,974,402 A * | 10/1999 | Lee et al. | 705/401 |
| 5,974,403 A * | 10/1999 | Takriti et al. | 705/412 |
| 6,021,401 A * | 2/2000 | Oravetz et al. | 705/412 |
| 6,021,402 A * | 2/2000 | Takriti | 705/412 |
| 6,047,274 A * | 4/2000 | Johnson et al. | 705/412 |
| 6,105,000 A | 8/2000 | Hickman et al. | |
| 6,112,159 A * | 8/2000 | Bond et al. | 702/61 |
| 6,169,979 B1 | 1/2001 | Johnson | |
| 6,456,982 B1 | 9/2002 | Pilipovic | |
| 6,598,029 B1 | 7/2003 | Johnson et al. | |
| 6,714,000 B2 | 3/2004 | Staats | |
| 6,778,968 B1 | 8/2004 | Gulati | |
| 6,922,677 B1 | 7/2005 | Sperandeo | |
| 2002/0010670 A1 | 1/2002 | Mosler et al. | |
| 2002/0065699 A1 | 5/2002 | Talluri | |
| 2002/0152111 A1 | 10/2002 | Cox et al. | |
| 2002/0165816 A1 | 11/2002 | Barz | |
| 2003/0101123 A1 | 5/2003 | Alvarado et al. | |
| 2006/0026095 A1 | 2/2006 | Alvarado et al. | |
| 2006/0026096 A1 | 2/2006 | Alvarado et al. | |

OTHER PUBLICATIONS

Henney, Alex. Managing Total Corporate Electricity/Energy Markets. Electricity Journal. Oct., 1998. p. 1-10.*

Stoft, S. Primer on Electricity Futures and Other Derivatives What is Hedging? Jan. 1998. p. 1-68.*

Stoft, Steven. Financial transmission rights meet Cournot: How TCCs curb market power; tranmission congestion contracts. The Energy Journal 1, 1999. p. 1-14.*

"Primer on Electricity Futures and Other Derivatives" by S. Stoft et al., LBNL-41098, UC-1321.

"Pricing Scarce Transmission In a Bilateral Market" by S. Stoft, Jan. 31, 1998.

"The Organization of Competitive Wholesale Power Markets and Spot Price Pools" by P. Centolella, National Council: Electric Utility Restructuring/1996, http://eande.lbl.gov/ea/NationalCouncil/pubs/pool.html, pp. 1-35.

"Solving Power Flow Problems with a Matlab Implementation of the Power System Applications Data Dictionary" by F. Alvarado, Proceedings of HICSS-32, the Hawaii International Conference on System Sciences, Maui, Hawaii, Jan. 5-8, 1999.

"A Market Mechanism For Electric Power Transmission" by Hung-Po Chao et al., Journal of Regulatory Economics; 10:25-59 (1996).

"The Dynamics of Power System Markets" by F. Alvarado, PSerc-97-01, pp. 1-22.

"Management of Multiple Congested Conditions in Unbundled Operation of a Power System" by H. Glavitsch et al., IEEE Transactions on Power Systems, vol. 13, No. 3, Aug. 1998, pp. 1013-1019.

"FTR Auction User's Guide", Revised Apr. 9, 1999.

"Location-Based Trading and Risk Management" by F. Alvarado et al., EPRI Innovating Pricing Conference, Washington, DC, Jun. 1998, pp. 1-18.

"Bidder's Policy and Procedures Guide: 1999 Firm Transmission Rights Auction", California ISO, Nov. 2, 1999.

"FTR Primary Auction Winners" by V. Kasarjian—ISO Market Operations, Nov. 23, 1999.

Financial Information Form (For Establishing or Testing an EDI/Fedwire Connection to the ISO).

"Firm Transmission Rights: Secondary Market Participant Registration Form" California ISO.

http://www/caiso.com/aboutus/infokit/HowItWorks.html, Dec. 7, 1999.

"Client Services", http://www/caiso.com/clientserv/.

"Users Guide for Caiso SRS Web Sites" by W. Lee, California ISO, Dec. 6, 1999, pp. 1-6.

"PJM Markets: FTR Auctions", http:www.pjm.com/energy/ftr/ftrauc.html.

"Firm Transmission Rights Information", http://www.caiso.com/clientserv/ftr/.

"Market Operations", http://www.caiso.com/marketops/.

"Secondary Markets Procedures Guide: 2000 to 2001 Firm Transmission Rights", California ISO, Nov. 15, 1999.

FTR Settlement.

"Template Usage Examples for Secondary Registration System SRS), Firm Transmission Rights (FTR's) and Existing Transmission Contracts (ETC's)", California ISO, Mar. 16, 1999.

R. Rajaraman & F. Alvarado, PSerc Report No. 98-27 titled: "Managing Transmission Risk: The Theory of Spatial Hedging and Arbitrage," Nov. 19, 1998.

EPRI Report (#TR-114276 titled: "Managing Transmission Risk," Final Report dated Dec. 1999) with the instant application's two inventors (R. Rajaraman & F. Alvarado) are listed amongst the team of principal investigators.

R. Rajaraman & F. Alvarado, "Understanding price volatility in electricity markets," proceedings of the 33rd Hawaii Intl. Conf. on System Sciences; 5 pgs.

Gazalet E.G. & Ellis J., "Simplified Bidding for WEPEX," Sep. 9, 1996; 31 pgs.

Leotard, J.P., MIT EL 99-001, "Transmission Pricing and incentives for investments under Uncertainty in the Deregulated Power Industry," dated Jan. 26, 1999, published Feb. 1999; 150 pages.

ENRON presentation at IEEE Conf. titled: "Load Management: A Trading Perspective," 13 pages.

United States Notice of Allowance issued in U.S. Appl. No. 11/898,136 dated Aug. 14, 2009.

United States Notice of Allowance issued in U.S. Appl. No. 11/898,135 dated Aug. 19, 2009.

United States Notice of Allowance issued in U.S. Appl. No. 11/898,137 dated Aug. 26, 2009.

United States Notice of Allowance issued in U.S. Appl. No. 10/118,330 dated Sep. 15, 2009.

* cited by examiner

METHOD FOR MANAGING RISK IN MARKETS RELATED TO COMMODITIES DELIVERED OVER A NETWORK

RELATED APPLICATIONS

The present application claims the benefit of U.S. Provisional Patent Application Ser. No. 60/123,823 entitled, "A New Business Procedure for Electricity Markets: Hedging Against Transmission Congestion Risk in Locational Spot Markets. Detecting Arbitrage Opportunities. Valuing and Constructing Synthetic Locational Futures Contracts and Valuing and Constructing Locational Options and Other Derivatives", filed on Mar. 11, 1999 by Fernando L. Alvarado and Rajesh Rajaraman, and is a divisional of U.S. patent application Ser. No. 09/522,709, filed Mar. 10, 2000, the contents of which are incorporated by reference in their entirety.

FIELD OF THE INVENTION

The present invention relates to financial services and more particularly to a system and method for managing risk in markets related to commodity delivery over a network.

BACKGROUND OF THE INVENTION

For many years, electric power and communications utilities operated in a highly regulated market. As these and similar industries are restructured, deregulated, and created, new competitive commodity markets are coming into existence in which prices are determined by supply and demand. For example, regulated utilities historically sold wholesale power under cost-based tariffs with retail prices set on a cost-plus fixed-return basis. As a result, these utilities had no incentive to manage the risk of potential changes in the price of the power they generated. Users of power similarly had no incentive to manage price risk because they had no control over the price they paid for power. The shift to a competitive market, however, has created an increasing awareness of electricity price risk and the need for managing the price risk.

The need for managing the price risk of electricity is greater than in many other markets because there is a high variation in the price of electricity over both time and space. There is a high variation in the price of electricity over time because it is difficult to store electric power, necessitating that the electricity be produced when demanded. Even under normal conditions, electricity prices may fluctuate widely over the course of a day.

The high variation in the price of electricity over space is due to the physical nature of the power network. The power flow over a particular transmission line between two locations in an electric power network cannot be directly controlled due to the laws of physics, according to which electric power flows over all possible paths in accordance with their impedance. For example, the 1989 Federal Energy Regulatory Commission (FERC) transmission task force discovered that as much as 50 percent of a power transfer from Ontario Hydro to the New York Power Pool may have used transmission lines that were hundreds of miles away from the direct interconnection between the two locations. As a result, when electric power is transferred into or out of the power transmission grid, that transfer of power may affect the distribution of electricity on any transmission line in the network.

Congestion in the transmission system can have a significant effect on the price of electricity. When one transmission line in the network is loaded to its full capacity, power cannot be rerouted over a different transmission line to avoid the congested line. Even if the transmission of power is congested between only two locations, that congestion affects the prices of electricity at other locations in the network. The price of electricity downstream of the congested line tends to increase, encouraging additional power generation to be brought on line to serve the load downstream of the congested line. Meanwhile, the price of electricity upstream of the congested line will tend to decrease, discouraging power generation upstream of the congested line.

Various approaches have been proposed to manage the price risk of electricity. For example, a generator can hedge against the risk that the price of electricity will fall at a particular location electricity via a forward contract. A power forward contract is a privately negotiated agreement between commercial parties containing a binding obligation to deliver electricity at a specified location and price. A significant disadvantage of forward contracts is that the market for forward contracts can be illiquid at particular locations. Forward markets achieve higher liquidity by concentrating the market activity into a few standard locations. There are thousands of different locations in the power network but only a few locations in which any forward liquidity exists. Therefore, it may be difficult for the generator to find a willing buyer of the forward contract at an acceptable price at their specific location.

Futures contracts are generally standardized contracts for the delivery of a commodity (here, electricity) in the future at a price agreed upon when the contract is made. Because futures contracts are used primarily for hedging against price risk or speculating on the price of the commodity, market participants typically close out their futures contracts positions financially rather than through delivery. In the PJM (Pennsylvania, New Jersey, and Maryland) market, which has over 1000 locations, an electricity futures market currently exists for delivery only at the location PJM West.

Because the location for which a liquid forward and futures market exists is typically not the same location at which a particular market participant, such as a power generator, would like to make or take delivery, market participants using forward contracts to hedge their underlying positions incur basis risk because prices at different locations are not consistent. This basis risk is sometimes referred to as "Spatial Price Risk." For example, due to congestion, the price of electricity at one location may differ from the price of electricity at the liquidly traded location.

Besides forward and futures contracts, other price risk management contracts include price swaps, basis swaps, option contracts, and congestion compensation contracts. The first three types of risk management contracts are well-known outside of the wholesale electricity market. A congestion compensation contract explicitly compensates one of the parties if there is congestion on a transmission line. Various kinds of congestion compensation contracts have been proposed and are known under various names.

For example, a Transmission Congestion Contract (TCC) is a congestion compensation contract for buying power at one location and delivering the same amount of power at a different location at a specified price. The TCC pays if there is a difference in price between the two locations, or, in other words, if there is a congested line in the power network. A TCC, however, suffers from a lack of liquidity because there are thousands of locations in the power network, but relatively few market participants interested in a particular location.

As another example, Stoft proposed a futures contract, not on the price of electricity at a particular location, but on an explicit congestion price for delivering electricity between two locations. The explicit congestion price values the use of scarce transmission resources, such as a congestible transmission line. A disadvantage of this approach is that the market for such contracts does not currently exist and, in fact, is unlikely to come into being, because market participants are used to locational prices for electricity, not congestion prices for the transmission of electricity.

Other kinds of congestion compensation contracts include a Fixed Transmission Right (FTR) available from PJM, which is a financial contract that entitles the holder to a stream of revenues (or charges) based on a reservation level and hourly energy price differences across a specific path. The California Independent System Operator (ISO) has a hybrid contract called a "Firm Transmission Right" (also FTR) that combines features of FTRs and forward contracts. The markets for these and other congestion compensation contracts are not as liquid as the futures market and may be vulnerable to arbitrage. Moreover, spatial price variation (i.e., basis risk) makes it difficult to evaluate the price of congestion compensation contracts.

Therefore, there is a need for a technique to manage the price risk for electricity at a particular location that both uses liquid price risk instruments and accounts for spatial price variation. There is also a need for a method of evaluating the price of congestion compensation contracts and other price risk instruments, including forward and futures contracts. There also exists a need for identifying arbitrage conditions of price risk instruments for electricity, either to avoid being arbitraged or to profit from arbitrage.

SUMMARY OF THE INVENTION

These and other needs are addressed by the present invention, in which a combination of multiple price risk instruments, e.g. futures contracts, congestion compensation contracts, etc., is selected in a particular proportion that reduces or even eliminates the Spatial Price Risk associated with congestion. In contrast with other techniques, the price risk instruments need not be traded at the location in which the market participant is interested; thus, the market participant is free to choose among the most liquid of the available price risk instruments, such as futures contracts and possibly FTRs.

The present invention stems from the realization that the Spatial Price Risk is almost completely associated with the congestion prices of potentially congestible lines at a prospective time T in the future. From these congestion prices, the physics of the power flows dictates the pattern of locational prices of electricity within the network at the prospective time T, enabling any portfolio or combination of price risk instruments in the electricity market to be evaluated. More specifically, it is discovered that the cost f for a portfolio y of price risk instruments with respect to a market participant's underlying position z in the market at the prospective time T, can be described by the following equation:

$$f = (z'A - y'P'A)\lambda + y'F, \qquad (1)$$

where A represents distribution factors describing the physics of the power flows in the network as discussed in greater detail hereinafter, $\lambda$ represents the congestion prices of the congestible lines at the prospective time T, P represents the available market of price instruments (e.g. futures contracts, congestion compensation contracts, and other preferably liquid contracts in a market related to electricity), and F represents the current prices (for delivery at prospective time T) of the price risk instruments.

Since the Spatial Price Risk is associated with the congestion prices $\lambda$ and since the cost F of the price risk instruments is currently known, the market participant's Spatial Price Risk can be reduced or even eliminated by eliminating the role of $\lambda$ in equation (1). In other words, to eliminate Spatial Price Risk the portfolio y of price risk instruments should be chosen such that:

$$z'A - y'P'A = 0. \qquad (2)$$

Accordingly, one aspect of the invention relates to a method and software for managing risk in a market related to a commodity, such as electricity, delivered over a network. Locational prices of the commodity in the market are modeled as a linear combination of congestion prices for congestible lines in the network. Based on the model, a combination of price risk instruments for the market is produced in a proportion such that the effect of the congestion prices for the congestible lines on the locational prices of the commodity is reduced, or even eliminated.

Another aspect of the invention pertains to a method and software for evaluating a portfolio of price risk instruments in a market related to a commodity delivered over a network, such as electricity. A plurality of distribution factors is estimated that indicates the effects on one or more congestible lines in the network due to transfers of the commodity at respective locations in the network. The portfolio is then evaluated based on the estimated distribution factors. Other aspects of the invention involve a method for hedging a set of underlying positions in the market and identifying arbitrage opportunities by producing a portfolio of price risk instruments for the market based on the estimated distribution factors.

Still another aspect of the invention is related to portfolios derived by the above described methods or to any portfolio of price risk instruments in which the price risk instruments are proportioned such that the effect of congestion prices of at least some congestible lines in the network on the prices of the commodity at locations in the network is eliminated.

Other advantages of the present invention will become readily apparent from the following detailed description, simply by way of illustration of the best mode contemplated of carrying out the invention. The invention is capable of other and different embodiments, and its several details are capable of modifications in various obvious respects, all without departing from the invention. Accordingly, the drawing and description are illustrative in nature, not restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A methodology for managing risk in markets related to commodities delivered over a network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
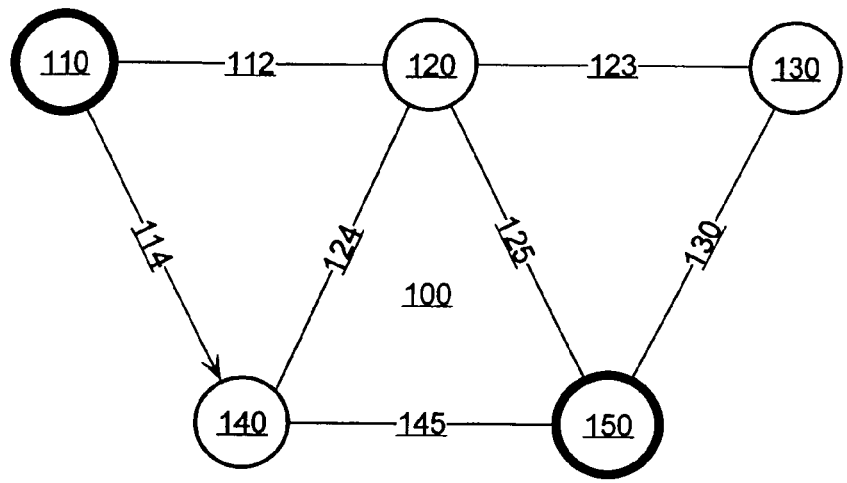
FIG. 1 depicts an exemplary power network.

In addition, the operation of embodiments of the present invention is illustrated with respect to an exemplary power network 100 shown in FIG. 1. The present invention is not limited to the exemplary power network shown in FIG. 1, but is capable of application to other network configurations and topologies, including existing power distribution networks comprising thousands of locations.

The exemplary power network 100 comprises, for purposes of explanation, five locations or "nodes", 110, 120, 130, 140, and 150. Node 110 is coupled to node 120 by transmission line 112 and to node 140 by transmission line 114. Node 120 is further coupled to node 130 by transmission line 123, to node 140 by transmission line 124, and to node 150 by transmission line 125. Nodes 130 and 140 are further coupled to node 150 by transmission lines 135 and 145, respectively.

For most examples discussed herein, it is further assumed that there exists the possibility of transmission congestion in transmission line 114 in the direction marked by the arrow, namely from node 110 to node 140. Furthermore, it is assumed that two liquid forward electricity markets or futures markets exist, based on prices at the locations of nodes 110 and 150, marked by a heavier line. Finally, it is also assumed that there are no transmission losses. Departures from this basic example, however, will be made to more fully explain the operation of particular embodiments of the present invention.

Modeling Locational Prices in the Network

Figure 2:
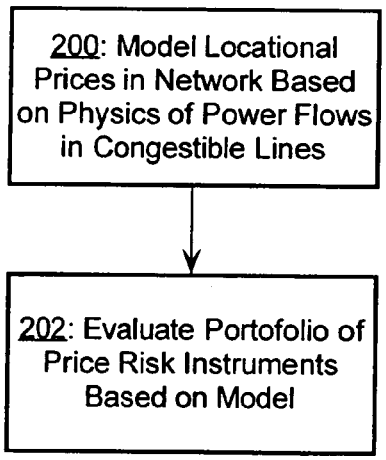
FIG. 2 is a flow diagram illustrating the operation of one embodiment of the present invention.
Figure 3:
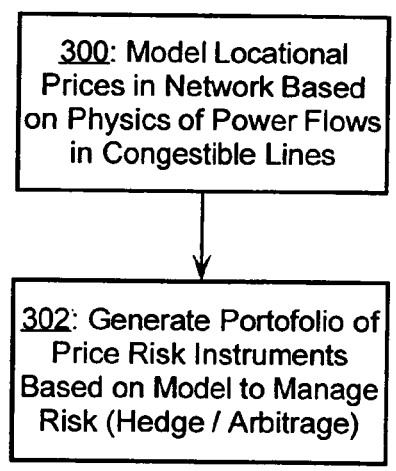
FIG. 3 is a flow diagram illustrating the operation of another embodiment of the present invention.

FIGS. 2 and 3 are flow diagrams illustrating the operation of different embodiments of the present invention, for example, to evaluate a portfolio of price risk instruments (see FIG. 2) or to generate portfolios of price risk instruments (see FIG. 3). In either case, the locational prices in the network are modeled at an initial step 200 or 300, respectively, based on the physics of power flows in relation to congestible lines.

The present invention stems from the realization that the physics of power flows in an electric power network governs the pattern of electricity prices at the multiple locations in the electric power network when one or more distribution and/or transmission lines are congested, even at a prospective time T in the future. More specifically, the pattern of locational prices can be derived from a linear combination of the congestion prices and the price of electricity at one "reference" location. Thus, the locational spot prices in the electric power network can be estimated by estimating the congestion prices, for example, by use of the following equation:

$$S = A\lambda, \qquad (3)$$

where S represents the pattern of spot location prices in the power network at the prospective time T, A represents distribution factors describing the physics of the power flows in the network, and $\lambda$ represents the prices of congestion for the congestible lines at the prospective time T.

In one embodiment, A is an (l+1)×n sensitivity matrix, where l represents the number of congestible transmission lines, referred to as "flowgates," and n represents the number of locations or nodes in the network. The first column of A describes the effect of transmission losses on transfers of electricity. In particular, each entry of the first column of A equals one plus the percentage of transmission losses that occur when an incremental transfer of electricity is made between a reference location and the location corresponding to the entry. In the special case when the power network has no transmission losses, the first column of A is all "ones."

Each of the remaining columns of A contains Power Transfer Distribution Factors (PTDFs) corresponding to each of the flowgates. Each entry of a flowgate PTDF column is the percentage of the incremental flow in the flowgate that results from a transfer of electricity between the reference location and the location corresponding to the entry. The factors can be estimated from the relative impedance of each of the transmissions, using a DC or AC load flow solution, and from sets of PTDFs available from the North American Electric Reliability Council (www.nerc.com).

Referring to the exemplary network in FIG. 1, n=5 because there are five nodes 110, 120, 130, 140, and 150, and l=1 because there is only one flowgate, namely, congestible transmission line 114 in the direction from node 110 to node 150. Since it is assumed for purposes of example that transmission lines 112, 114, 123, 124, 125, 135, and 145 are lossless, the first column of A is all ones. The second column of A contains the PTDFs corresponding to the flowgate 114. For example, if an additional one megawatt is injected at node 110 and removed at node 120, and if 38% of the injected power will flow through transmission line 114, then the corresponding entry for node 120 in the matrix A will be 0.38. The examples discussed hereinafter assume for purposes of illustration the following values in sensitivity matrix A:

$$A = \begin{bmatrix} 1.00 & 0.00 \\ 1.00 & 0.38 \\ 1.00 & 0.43 \\ 1.00 & 0.62 \\ 1.00 & 0.48 \end{bmatrix}. \qquad (4)$$

Furthermore, $\lambda$ is an (l+1)-dimensional vector that characterizes the congestion prices in the network, and may be based on the Lagrange multipliers corresponding to the power flow equations and flowgate congestion constraints. The first entry of $\lambda$ is the spot price of electricity at the reference node, and the remaining entries of $\lambda$ are the prices of congestion with respect to the reference node of the l congestible lines. When one or more of the l flowgates are congested, the corresponding entries in $\lambda$ become positive, but if the flowgate is not congested, the corresponding entry in $\lambda$ is zero.

There is uncertainty in $\lambda$ because there is uncertainty in whether there will be transmission congestion in the future. On other hand, there is little or no reasonable uncertainty in the sensitivity matrix A, because market participants can infer the values of A from market observations, applications of the laws of physics, and the information published by NERC. Therefore, the uncertainty in locational prices is almost completely due to the uncertainty in $\lambda$, and the effect of spatial risk in one's portfolio can be reduced or even eliminated, by reducing the role of the parameter $\lambda$.

In the example, there is only one congestible transmission line, flowgate 114. Thus, $\lambda$ would be a two element column vector $[\lambda_1, \lambda_2]'$, where $\lambda_1$ represents the spot price of electricity at node 110, and $\lambda_2$ represents the congestion price for flowgate 114. If the spot price for electricity at node 110 is $\lambda_1 = \$20.00$, and if there is no congestion in flowgate 114, i.e. $\lambda_2 = \$0.00$, then the spot prices in the network 100 is S=[20.00, 20.00, 20.00, 20.00, 20.00]'. This example shows that there is no spatial variation in price if there is no congestion.

On the other hand, if there is congestion on flowgate 114, then the second entry of $\lambda$ assumes a positive value. Assuming that the spot price for electricity at node 110 is still $\lambda_1$=$20.00 but that the congestion price for flowgate 114 is $\lambda_2$=$10.00, for example, the spot prices in the network 100 become is S=[20.00, 23.80, 24.30, 26.20, 24.80]'. The higher spot price at node 140, $S_4$=$26.20, will encourage generators attached to node 140 to supply more power at node 140, thereby reducing the congestion on transmission line 114.

Evaluating Portfolios

Referring to FIG. 2, after modeling in step 200 the locational prices in the network 100, a portfolio of price risk instruments is evaluated based on the model (step 202). As used herein, a portfolio is a set of positions to take financial advantage of particular market conditions or characteristics. The financial advantage may be to hedge against risk, in which the value of the portfolio is generally negative, or to assume risk, in which the value of the portfolio hopefully is positive. A position is a specific asset or obligation traded in a market related to a commodity delivered over a network, such as the wholesale electricity market, the electricity derivatives market, and related markets. A price risk instrument refers to a position taken for delivery or settlement at a prospective time T in the future in the market and may include, for example, forward contracts, futures contacts, congestion compensations contracts, such as TCCs and FTRs, price swaps, basis swaps, option contracts, and other derivative contracts.

The m available price risk instruments for a network may be expressed as an n×m matrix P in terms of a weighted average of the prices at the n locations in the market. A futures contract for delivering power at a particular location would have a 1.0 for that location and a 0.0 elsewhere. A TCC, on the other hand, would have a 1.0 at the location where power is added and a −1.0 where power is removed. In the example of FIG. 1, there are two futures markets, one for delivering electricity at node 110 and another for delivering electricity at node 150. Thus, P defined for the example as:

$$P = \begin{bmatrix} 1.0 & 0.0 \\ 0.0 & 0.0 \\ 0.0 & 0.0 \\ 0.0 & 0.0 \\ 0.0 & 1.0 \end{bmatrix}. \quad (5)$$

The market participant's underlying position in the market may be given as an n-dimensional vector z indicating the buy and sell obligations at a prospective time T in the future. Positive values in z represent net load (or buy) obligations, and negative values represent net generation (or sell) obligations. Generally, z will have non-zero values for a market participant who would like to hedge a particular underlying position, and all zeros for a speculator whose primary interest is assuming price risk.

The market participant's underlying position z at the prospective time T in the future may be met by taking positions x in the spot market at time T, by taking positions y with price risk instruments (e.g. in a futures market now for delivery or settlement at time T), or a combination of both. Thus, $$z = x + Py. \quad (6)$$

The cost f to a market participant of a portfolio is given by (where negative f implies profits and prime denotes transposition):

$$f = x'S + y'F, \quad (7)$$

where F is an m-dimensional vector that represents the prices of the respective price risk instruments. Combining equations (3), (6), and (7), the resulting formula for calculating the cost f of a portfolio y of price risk instruments in relation to the market participant's underlying position can be given by:

$$f = (z' A - y' P' A)\lambda + y' F. \quad (8)$$

In the example, if a market participant has a set of buy/sell obligations z=[2, −1, 2, −3, 1]', the cost for the market participant to meet all the obligations in the spot market at time T (i.e. y=0) would be f=z'A$\lambda$. If the spot price for electricity at node 110 at time T is $20.00/MW and there is no congestion, then $\lambda$=[20.00, 0.00]' and, therefore, f=$20.00. However, with the same spot price for electricity of node 110 of $20.00/MW, if there is congestion on transmission line 114 with a congestion price of $10.00/MW, then $\lambda$=[20.00, 10.00]' and, therefore, f=$11.00. The price swing of $9.00/MW shows that there is considerable Spatial Price Risk due to congestion.

If the market participant takes a long (buy) position of 1 MW at time 0 for delivery at time T in the futures market for node 110, with the prices of futures given by F=[20.00, 22.00], then the cost in the first scenario of $\lambda$=[20.00, 0.00]' is also $20.00/MW, but the cost in the second scenario of $\lambda$=[20.00, 10.00]' is $11.00/MW. Thus, there still is a price swing of $9.00/MW, showing that taking the position in a single price risk instrument has not reduced, in this example, the spatial risk due to congestion.

Hedging

Referring to FIG. 3, another aspect of the present invention pertains to modeling the electric power network (step 300) and then generating a portfolio to manage risk, for example, by hedging, constructing new price risk instruments, and identifying low-risk arbitrage opportunities.

One embodiment of the invention therefore relates to hedging against the risk of an underlying position, which means reducing the price risk for fulfilling the underlying position at a prospective time T in the future. Referring back to equation (8), since the cost of the price risk instrument F is known at time 0, the second term y'F is not subject to risk. All the spatial risk, thus, is associated with the uncertainty in the congestion price vector $\lambda$. To eliminate the spatial risk, therefore, the portfolio y of price risk instruments is chosen such that term with the congestion price vector $\lambda$ becomes zero, or $$z'A - y'P'A = 0. \quad (9)$$

To fulfill the remainder of the underlying position z at prospective time T, the market participant takes the position z−Py in the spot market at time T. The hedge costs y'F.

Equation (9) may be viewed as a linear equation in y, the market participant's portfolio of price risk instruments. If m (the number of price risk instruments) is strictly less than l+1 (one more than the number of congestible transmission lines), then there are too many equations in too few unknowns, and equation (9) will not usually be satisfied. In this case, however, the market participant may make a "partial hedge" by selecting a number of possible congestion events that is less than the number of price risk instruments. Accordingly, the market participant reduces exposure to the selected congestion events, while still remaining subject to the risk of the non-selected congested events.

On the other hand, if m is strictly greater than l+1, then there are too few equations and too many unknowns, and equation (9) will be satisfied for many different portfolios y.

In fact, the presence of too many m price risk instruments will lead to the possibility of arbitrage.

Finally, if m equals l+1, there are as many equations as there are unknowns, and equation (9) will usually have a unique solution y. Equation (9) will also have a solution if z'=y'P', which for an arbitrary z will have solution if and only if P is invertible or m=n. Therefore, complete hedging is available when the number of available price risk instruments is greater than the number of congestible transmission lines, i.e. m≧l+1, or when the number of price risk instructions equals the number of locations, i.e. m=n.

In the example, there are two futures markets (i.e., m=2) at nodes 110 and 150, but only one congestible line 114 (i.e., l=1). Therefore, there exists the possibility of complete hedging of the market participant's underlying position of buy/sell obligations z=[2, −1, 2, −3, 1]'. Solving for y in z'A−y'P'A=0, the solution y=[2.9, −1.9]' is obtained. A variety of matrix algebra and linear optimization techniques may be employed to solve for y, for example, by use of the MATLAB™ software package, but the present invention is not limited to any particular technique.

Accordingly, the market participant would take a long (buy) position (2.9 MW) in the futures market at node 110 and a short (sell) position (−1.9 MW) in the futures market at node 150 for delivery or settlement at time T. The cost of the hedge is y'F=$16.20, which is the total cost to the market participant if there is no congestion (e.g., λ=[20.00, 0.00]') or even if there is congestion (e.g., λ=[20.00, 10.00]'). Since the cost is always the same, notwithstanding the congestion of flowgate 114, the Spatial Price Risk is completely eliminated. While the risk is completely eliminated, the hedge will not necessarily leave the market participant better off than if the market participant had only participated in the spot market. In the example, with λ=[20.00, 10.00]', the market cost is $11.00, but the hedge cost $16.20. The reason why the market participant chooses to hedge, however, is for risk aversion, not profit maximization.

Synthetic Price Risk Instruments

Hedging is generally favored by those market participants, such as utilities, that have a known underlying position in the actual commodity market in the form of power generation and load obligations against which the market participant would like to eliminate price risk. The principles described herein above, however, can also help brokers, dealers, financial institutions, and other financial services providers in offering new price risk instruments, even at locations that are not actively traded on the market.

A financial services provider who offers a new price risk instrument in effect creates an underlying position z in the commodity and related markets reflective of the new price risk instrument. Thus, the financial services provider can use equation (9) to hedge against that new underlying position z with price risk instruments at other locations to eliminate the price risk for the financial services provider. The price of the hedge will then determine the price at which the new price risk instrument should be offered. The new price risk instruments may include TCCs and other congestion compensation contracts at locations that are not actively traded on the market. A buyer's choice contract, which grants the right to get power from any of a plurality of locations in the network, can also be constructed.

In the example illustrated in FIG. 1, suppose a financial services provider wishes to offer a 1 MW Transmission Congestion Contract (TCC) from node 130 to node 120. A TCC from one location to another pays the difference in the price of electricity at the two locations, and can be used by others to hedge against risk. Thus, the underlying position of the TCC is z=[0, −1, 1, 0, 0]'. Using A and P defined in equations (4) and (5), respectively, and equation (9), the portfolio of existing price risk instruments to hedge against the TCC is chosen as y=[−0.1, 0.1]. In other words, the financial services provider should take a long position of 0.1 MW at node 150 and a short position of −0.1 MW at node 110. The cost of this synthetic TCC would be y'F=$0.20.

Arbitrage

If a financial services provider is not careful in offering a new price risk instrument at the appropriate price, that financial services provider may become vulnerable to arbitrage. Arbitrage is the purchase of various financial instruments for a given time to profit from a price discrepancy. In accordance with one aspect of the present invention, an arbitrage condition exists among the electricity market related price risk instruments if there exists a portfolio y such that the following conditions are satisfied:

$$y'P'A=0 \text{ and } y'F<0. \quad (10)$$

The first condition follows from equation (9), in which the arbitrageur has no actual underlying position (i.e., z=0) in the market, but wishes to take a set of positions y to take financial advantage of the market. The second condition merely states that the cost of the arbitrage portfolio y is profitable. The first arbitrage condition is satisfied when either the rows of P'A or the rows of P' are linearly dependent, which generally occurs when m (the number of available price risk instruments) exceeds l+1 (one plus the number of congestible transmission lines) or exceeds n (the number of locations in the network). In other words, if there are "too many" electricity price risk instruments, then there is a possibility of arbitrage.

To illustrate, assume that, in addition to price risk instruments offered in the example of FIG. 1, a 1 MW TCC is also offered from node 140 to node 130 at a price of $0.10. Thus, the matrix of available price risk instruments becomes:

$$P = \begin{bmatrix} 1 & 0 & 0 \\ 0 & 0 & 0 \\ 0 & 0 & -1 \\ 0 & 0 & 1 \\ 0 & 1 & 0 \end{bmatrix}. \quad (11)$$

Furthermore, assume that the future prices of these three markets are F=[20.00, 21.00, 0.10]'. The cost of the TCC is normally considerably lower than the energy supply contracts, because the TCC does not involve energy per se, but rather the transfer of energy. If there is no congestion, for example, the energy transfers offset at the same price and the value of the TCC is zero. Based on these values of P, A, and F, it is possible to find a portfolio y of the three price instruments y=[1.0, −1.0, 2.5]', such that closing out this position at time T will generate a guaranteed profit of $0.75. If, however, the TCC was offered at the price of $0.40 (determined by the methodology described with respect to creating synthetic price risk instruments), then the value of the arbitrage portfolio would be $0.00, indicating that the TCC is appropriately priced.

Unlike other market participants, such as utilities, arbitrageurs are generally willing to give up the elimination of Spatial Price Risk if they can always make a profit in every congestion scenario, even when the profit is variable. Accordingly, arbitrageurs would seek to find a portfolio y such that the following generalized conditions hold for all congestion scenarios Λ:

$$-y'P'A\lambda + y'F \leq 0, \text{ for all } \lambda \text{ in } \Lambda \quad (12)$$

with the above inequality being strict for at least one member of Λ.

Options and Other Derivative Contracts

Options and other derivative contracts differ from the previously discussed price risk instruments in that their value is not linear. For example, an option grants the right but not obligation to buy a commodity at a specified "strike" price. Thus, if the price of the commodity is less than the strike price, then the option will not be exercised unless the option holder would like to take a guaranteed loss. On the other hand, the option holder will exercise the option if the price of the commodity exceeds the strike price, because the option holder can lock in a profit. Consequently, the valuation of an option needs to take into account the expected values of the commodity prices to estimate the likelihood that the strike price will be exceeded.

Accordingly, an aspect of the present invention extends the evaluation of price risk instruments for options and other non-linear derivatives in equation (8) to account for the expected variation of congestion prices:

$$f = (z' - y'P)A\hat{E}(\lambda(T)) + y'F, \quad (13)$$

where $\hat{E}(\lambda(T))$ represents a risk-neutral expectation for the congestion prices at time T. In one embodiment, the congestion is modeled by a combination of a Wiener process and a Poisson jump process to arrive at the following analytical solution:

$$\hat{E}(\lambda_i(T)) = \lambda_i(0)e^{-\beta_i^- T} + \left(1 - e^{-\beta_i^- T} - \frac{\beta_i^-}{\beta_i^- + \beta_i^+}(1 - e^{-(\beta_i^- + \beta_i^+)T})\right)E(u_i), \quad (14)$$

where $\beta_i^-$ and $\beta_i^+$ represent the mean arrival rates of the Poisson jump and death processes, respectively, which may be obtained using moment matching techniques on probability distributions of other options, and $E(u_i)$ represents an expected Poisson random jump size.

Hardware and Software Overview

Figure 4:
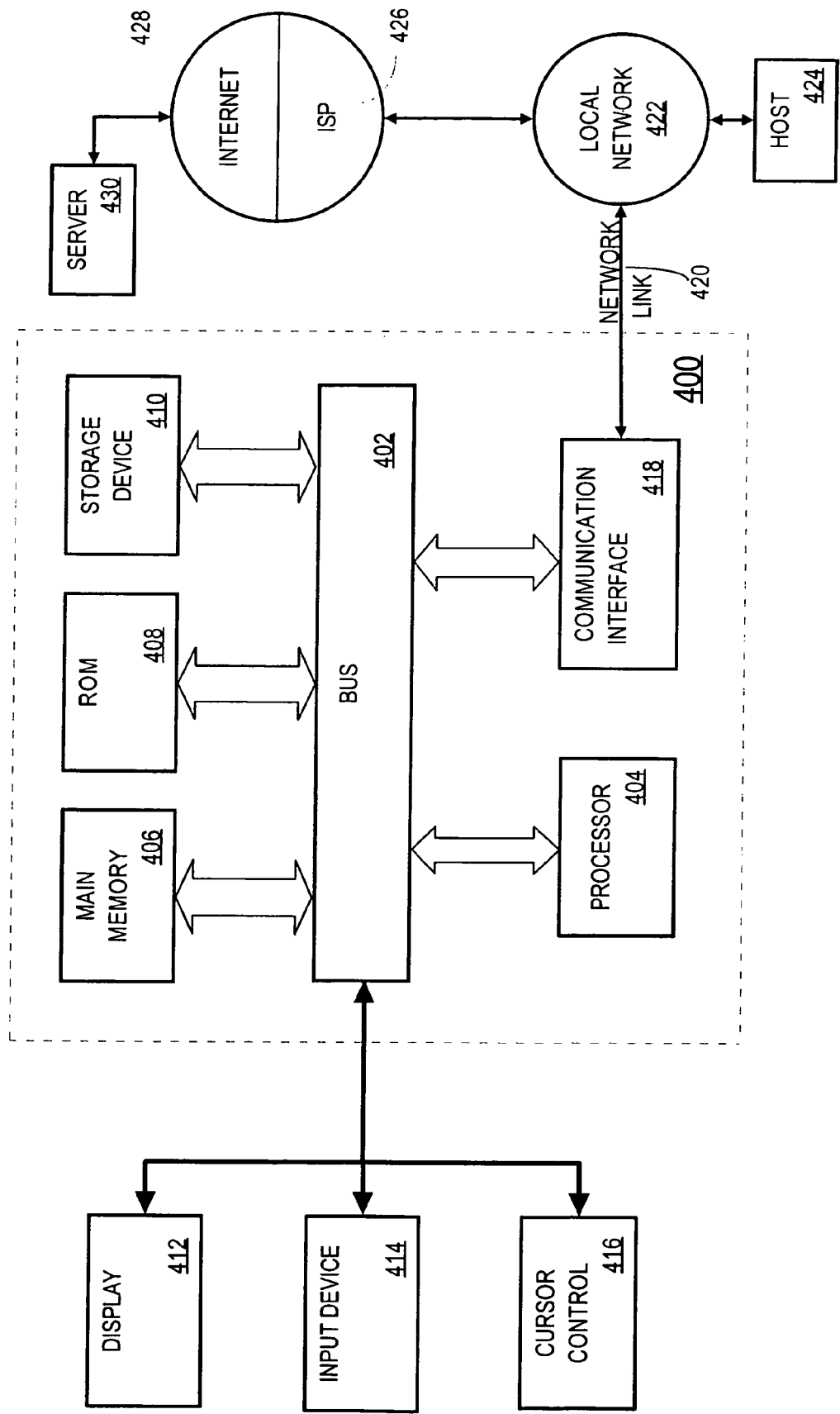
FIG. 4 depicts a computer system that can be used to implement an embodiment of the present invention.

In certain embodiments, execution of one or more steps in FIGS. 2 and 3 may be automated on a computer system, which can be, for example, a mainframe computer, minicomputer, workstation, personal computer, a web server, a thin client, and an Internet appliance. FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

One embodiment of the invention is related to the use of computer system 400 for trading. According to one embodiment of the invention, trading is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media include, for example, optical or magnetic disks, such as storage device 410. Volatile media include dynamic memory, such as main memory 406. Transmission media include coaxial cables, copper wire and fiber optics, including the wires that comprise bus 402. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be borne on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions.

The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network, now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420, and communication interface 418. In the Internet example, a server 430 might transmit a requested code for an application program through Internet 428, ISP 426, local network 422 and communication interface 418. In accordance with the invention, one such downloaded application provides for trading as described herein. The received code may be executed by processor 404 as it is received, and/or stored in storage device 410, or other non-volatile storage for later execution. In this manner, computer system 400 may obtain application code in the form of a carrier wave.

Accordingly, a system, method, software, and portfolios for managing risk in markets relating to a commodity delivered over a network are described. More specifically, techniques are disclosed, wherein a market participant can construct portfolios of preferably liquid price risk instruments in specific proportions such that the price risk for the market participant's underlying position is reduced or even eliminated for contemplated congestion conditions. In addition to hedging, market participants can construct and properly evaluate new price risk instruments, as well as identify arbitrage opportunities among offered new price risk instruments whose prices are not reflective of the physics of power flows.

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims.

What is claimed is:

1. A method for hedging a set of underlying positions at a prospective time in a market related to a commodity delivered over an electric power network, comprising the steps of:

using a computer for estimating a plurality of distribution factors indicating effects on one or more congestible lines in the electric power network due to transfers of the commodity at respective locations in the electric power network; and using a computer for producing a portfolio of price risk instruments for the market based on the estimated distribution factors, wherein the step of producing the portfolio includes selecting a portfolio y of price risk instruments, such that $z'A-y'P'A=0$, where A represents the distribution factors, P represents the available market of price instruments, z represents the underlying position, and the ' (prime) symbol denotes a transpose of a matrix.

2. A method for identifying arbitrage opportunities among a plurality of available price risk instruments in a market related to a commodity delivered over an electric power network, comprising the steps of:

using a computer for estimating a plurality of distribution factors indicating effects on one or more congestible lines in the electric power network due to transfers of the commodity at respective locations in the electric power network; and using a computer for producing a portfolio of price risk instruments from among the available price risk instruments based on the estimated distribution factors, wherein a number of the price risk instruments is greater than a number of the one or more congestible lines, wherein the step of producing the portfolio includes selecting a portfolio y of price risk instruments, such that $y'P'A=0$, where A represents the distribution factors, P represents the available market of price instruments, and the ' (prime) symbol denotes a transpose of a matrix.

* * * * *